May 1, 1923.
W. N. STEVENS
1,453,732
AUTOMATIC MACHINE TOOL
Filed Aug. 26, 1921
13 sheets-sheet 8
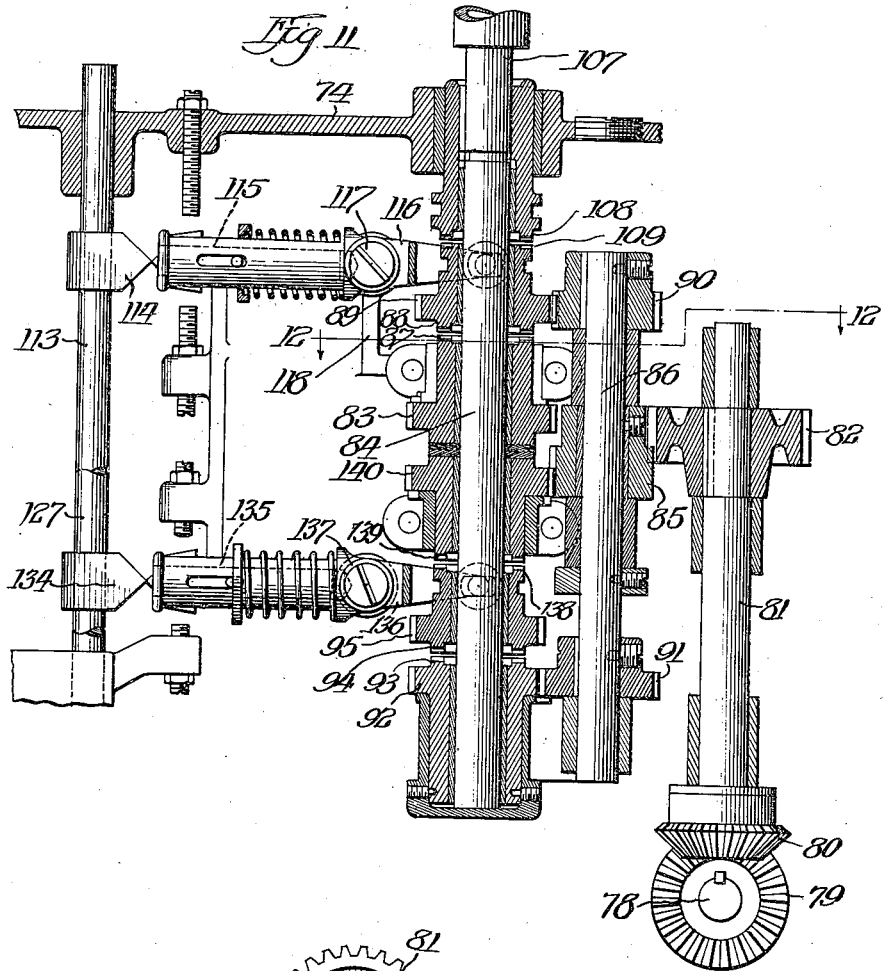
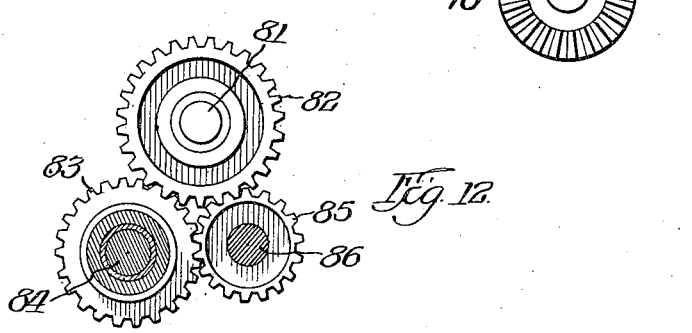
Witness:
Inventor:
William N. Stevens,
By Samuel N. Pond, Atty.

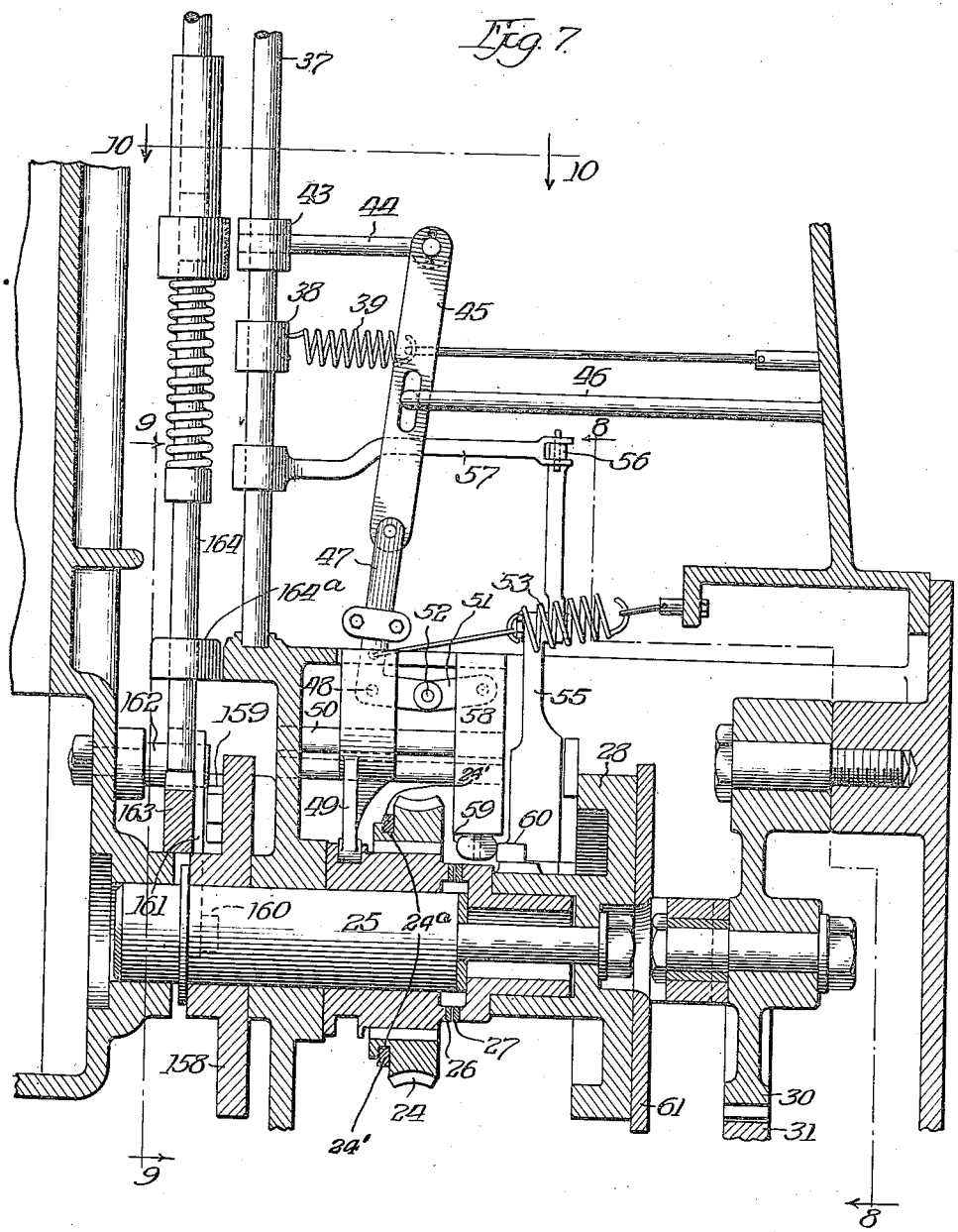

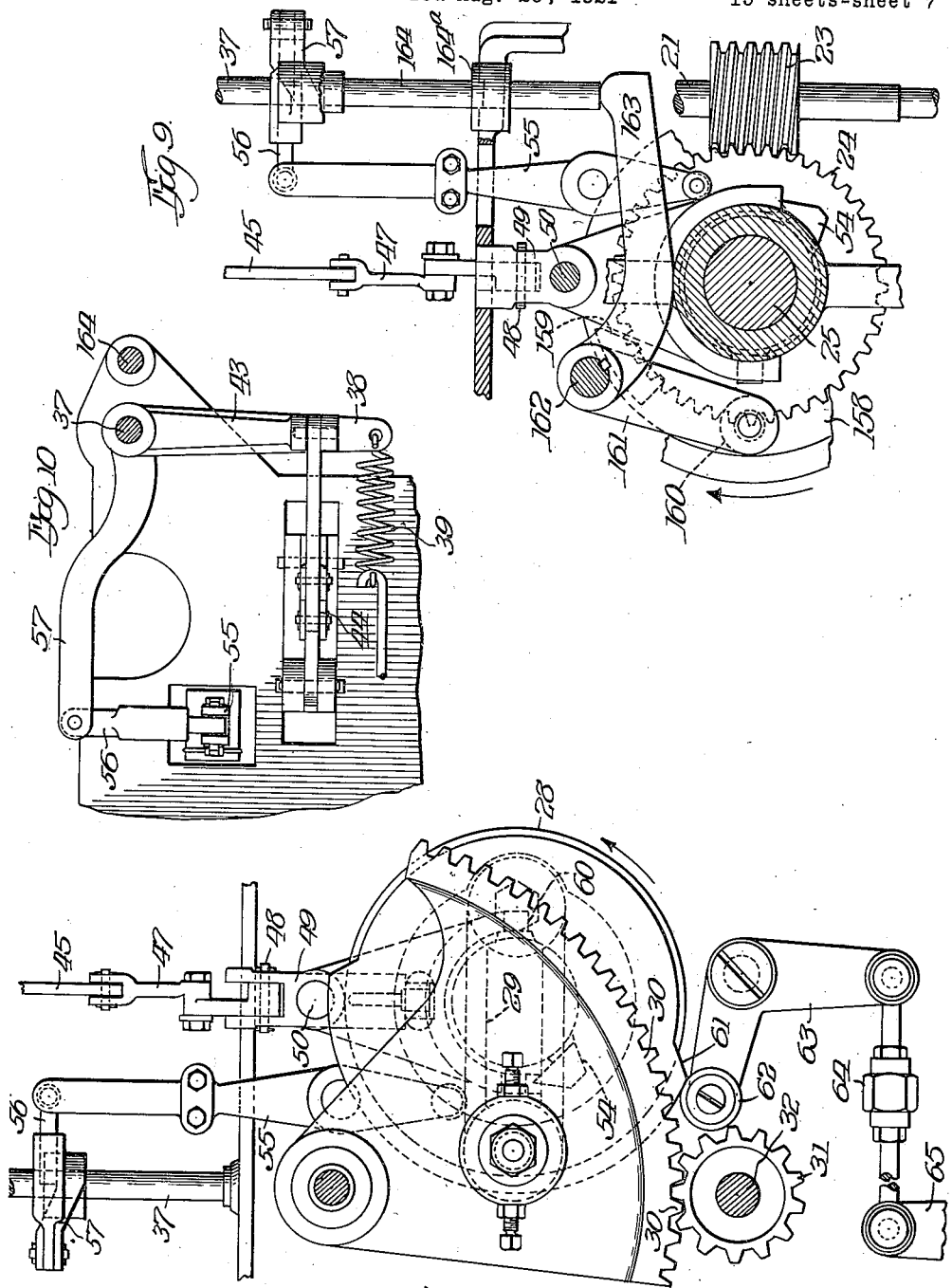

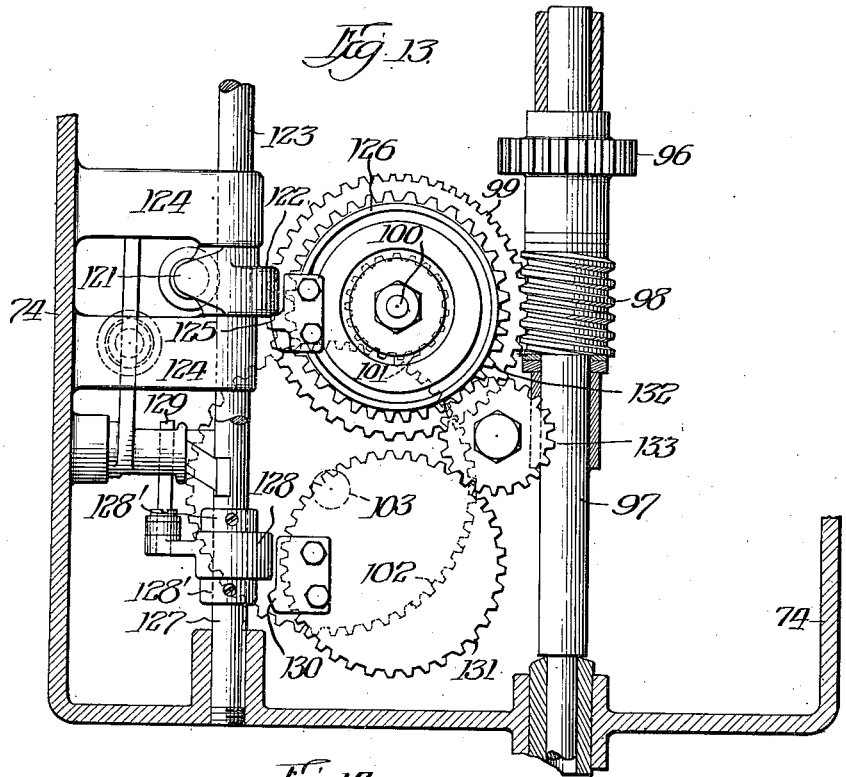
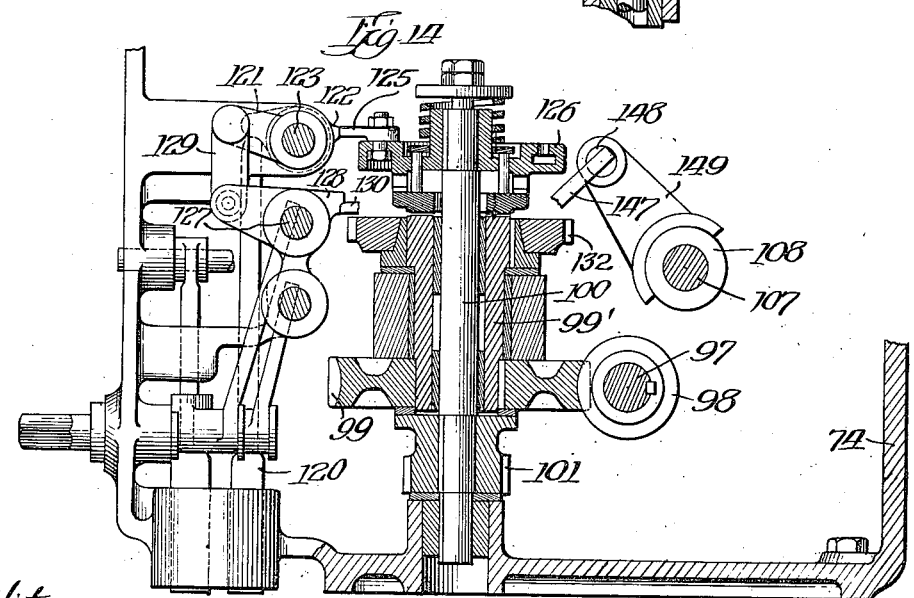

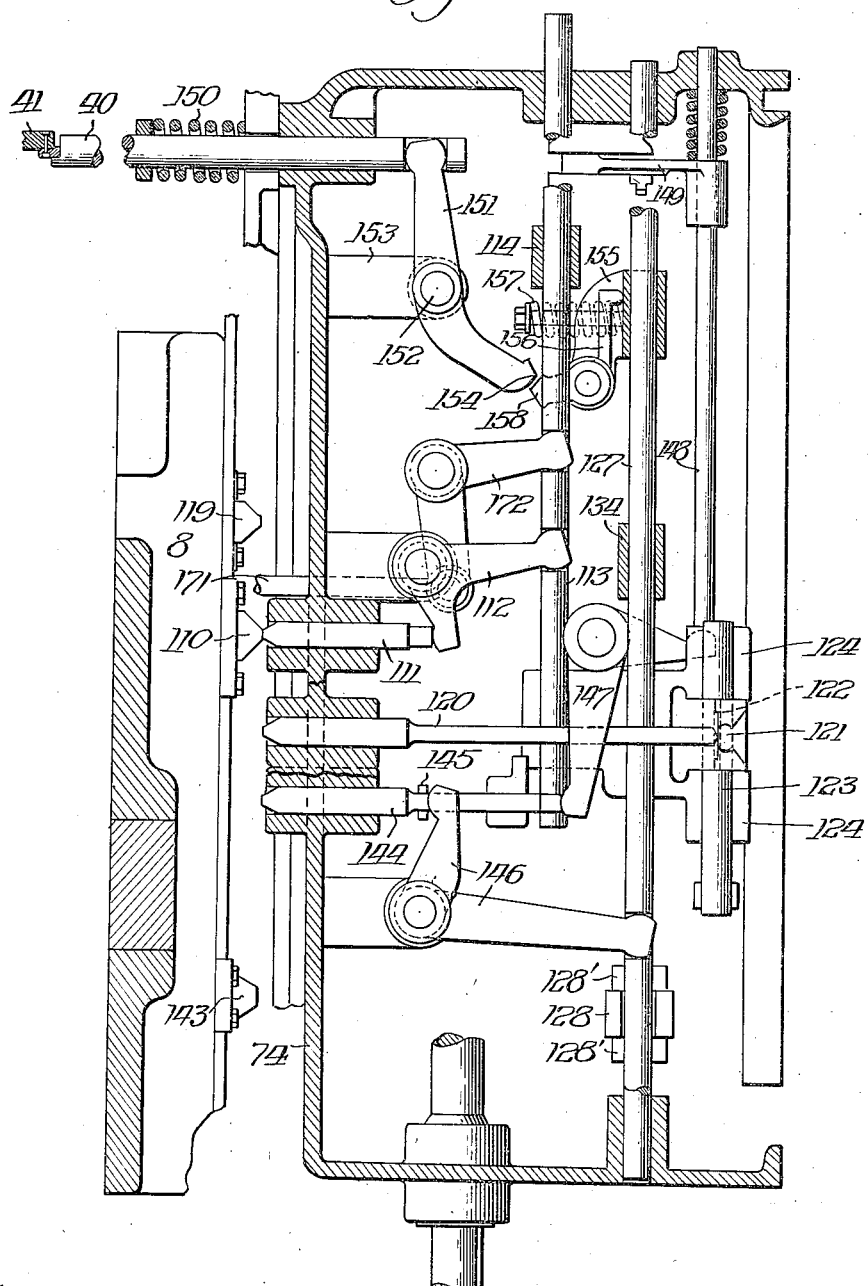

May 1, 1923.
W. N. STEVENS
AUTOMATIC MACHINE TOOL
Filed Aug. 26, 1921
1,453,732
13 sheets-sheet 11
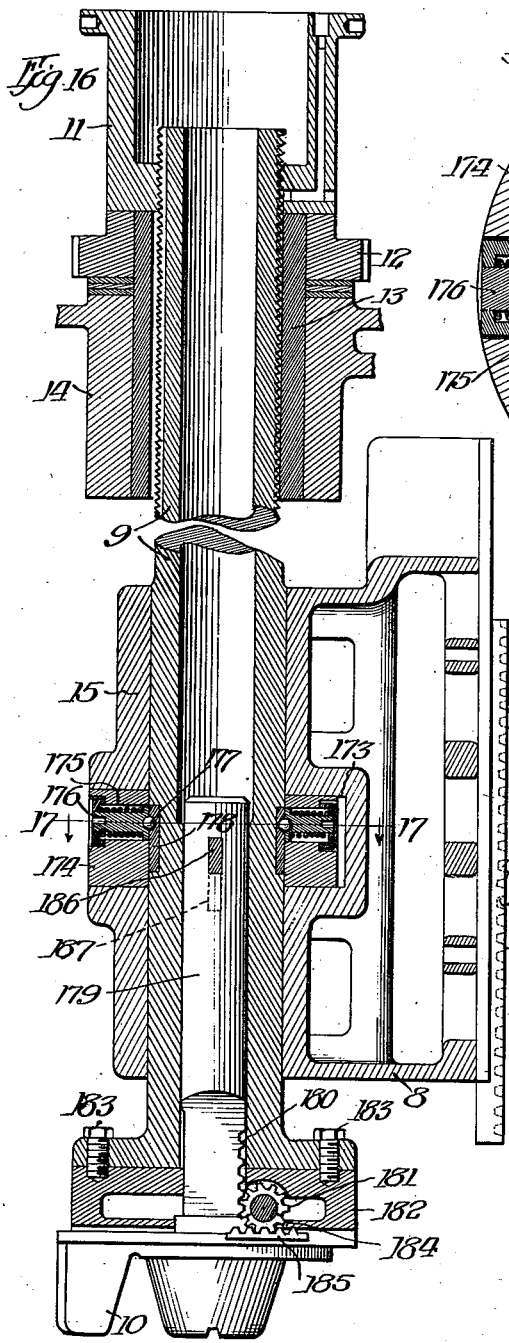
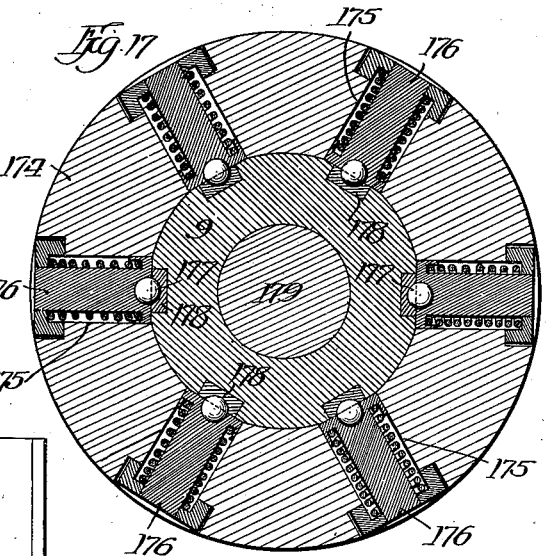
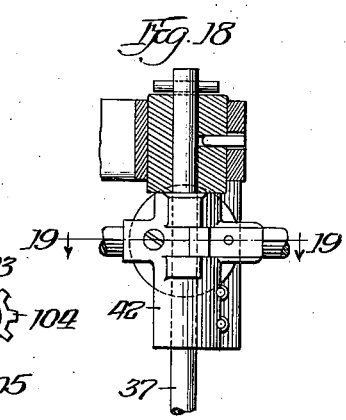
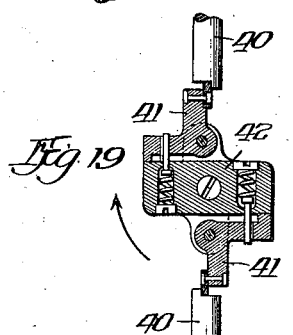
Witness:
Fred C. Dorson
Inventor:
William N. Stevens,
By Samuel N. Pond,
Atty.

May 1, 1923.
W. N. STEVENS
AUTOMATIC MACHINE TOOL
Filed Aug. 26, 1921
1,453,732
13 sheets-sheet 12
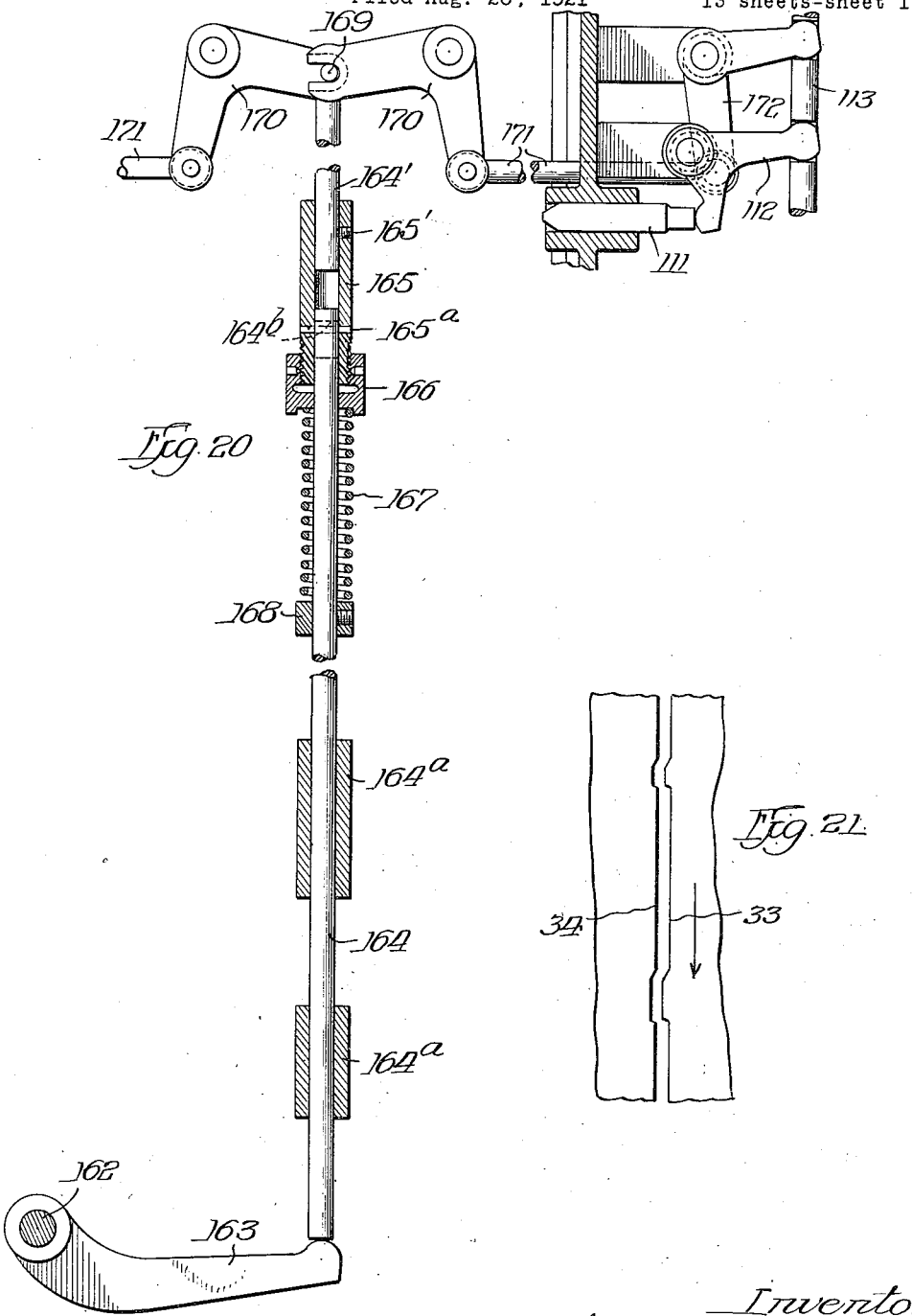

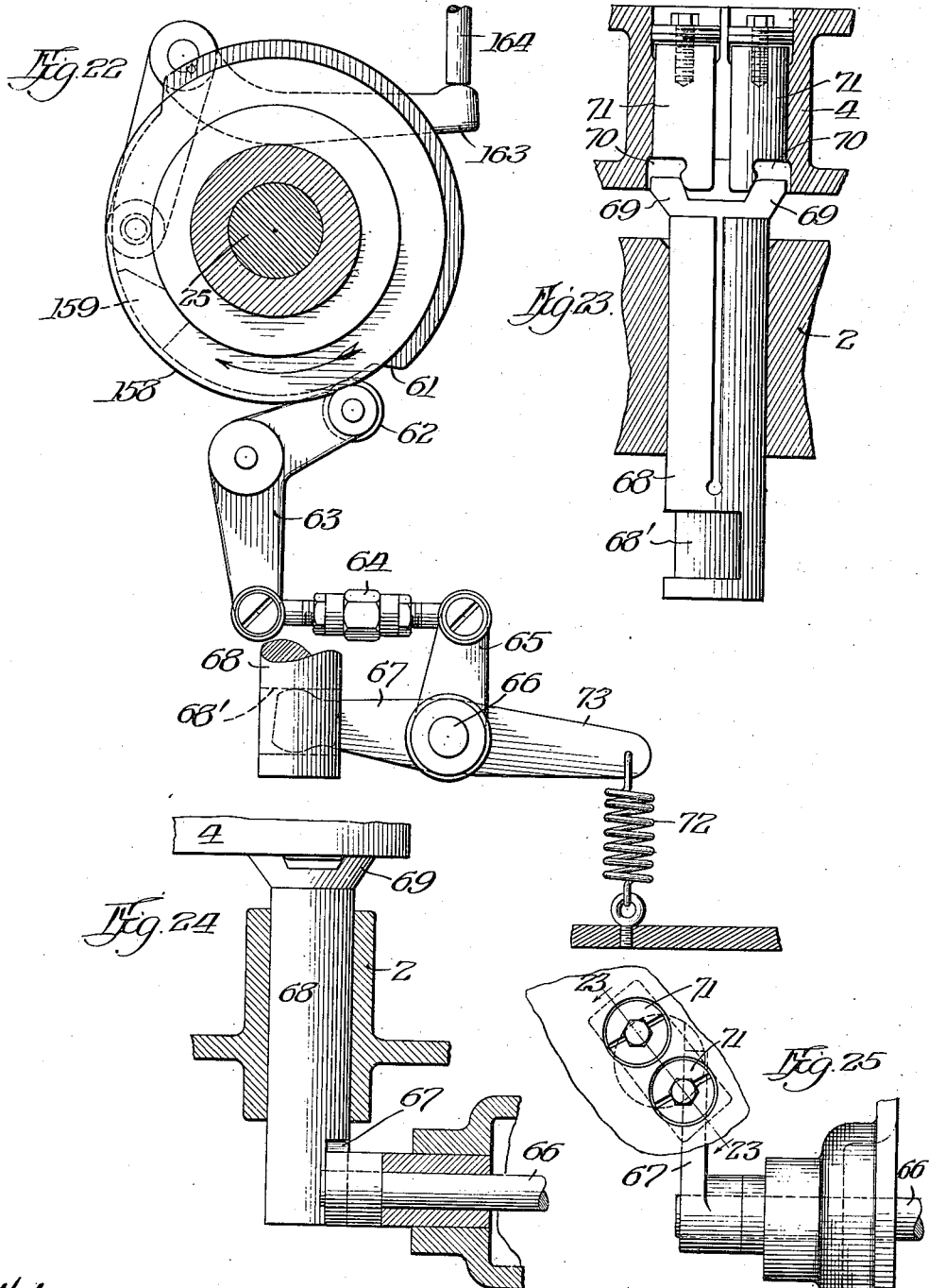

Patented May 1, 1923.

1,453,732

UNITED STATES PATENT OFFICE.

WILLIAM N. STEVENS, OF MADISON, ILLINOIS, ASSIGNOR TO GISHOLT MACHINE COMPANY, OF MADISON, WISCONSIN, A CORPORATION OF WISCONSIN.

AUTOMATIC MACHINE TOOL.

Application filed August 26, 1921. Serial No. 495,707.

*To all whom it may concern:*

Be it known that I, WILLIAM N. STEVENS, a citizen of the United States, residing at Madison, in the county of Dane and State of Illinois, have invented certain new and useful Improvements in Automatic Machine Tools, of which the following is a specification.

This invention relates to improvements in automatic machine tools, and has reference more particularly to a vertical automatic machine of multiple spindle form adapted to handle a large variety of work and automatically perform different operations simultaneously upon a series of like pieces, and combining the characters and functions of a vertical lathe, a boring mill, a drill, and in general, any and all machine tools of the chuck and spindle type.

Among the principal objects of the invention, are: to provide an improved machine tool which will be automatic throughout and adapted to perform a large variety of boring, turning, facing and drilling, and other operations upon the work; to provide in such a machine, a plurality of spindles which may operate simultaneously upon a corresponding plurality of pieces, performing different operations upon each, in combination with a rotary table so as to carry each piece of work from one station to the next through the entire series; to provide, in such a machine, in combination with a group of rotary spindles carrying the tools, a rotary table having a group of stationary work holders or chucks adapted to be indexed successively beneath the spindles and preferably exceeding the number of spindles by two, whereby one chuck can be loaded with a fresh casing and another chuck be simultaneously unloaded, while the remaining chucks are in working relation to the spindles, thereby effecting an economy of time and avoiding the necessity of stopping the machine during the chucking and unchucking of the work; to provide a machine of the character specified wherein the spindles may be independently advanced to the work under a rapid traverse movement, then automatically returned to starting position under a rapid traverse movement; to provide in a multiple spindle machine of the character specified an automatic mechanism whereby, as each spindle finishes its work and returns to starting position, it is automatically detained in such position until the last spindle has tripped out its feed and returned to starting position; to provide, in such a machine, means for allowing a few revolutions of the spindle with the feed stopped and before the return movement is tripped in to effect removal of the tool mark; to provide a machine of the class mentioned wherein the spindle shall be adapted to carry and operate boring, turning and facing tools; to provide a machine of the character described in which the mechanism for effecting and controlling the rapid traverse and feed movements of the spindle slides shall be located in visible, convenient and easily accessible positions, so as to facilitate the setting of trip parts, inspection of the condition of the mechanism, and repairs and renewals when required.

Other objects and many of the attendant advantages of the invention will be apparent to persons familiar with machine tools of this general type from the following detailed description, taken in connection with the accompanying drawings, which describe and show one mechanical embodiment of the principles of the invention which has been found in practice to satisfactorily fulfill the purposes and objects above stated.

Fig. 7 is a view partly in elevation and partly in vertical section of the indexing clutch and drive; also showing the index trip and cocking mechanism;

Fig. 8 is an elevation of the index drive mechanism, partly in section on the line 8—8 of Fig. 7, and showing locking pin cam, cocking cam, and index clutch throwout cam;

Fig. 9 is an opposite end elevation of the index drive mechanism, partly in section on the line 9—9 of Fig. 7;

Fig. 10 is a sectional plan of parts of the indexing and cocking mechanism, taken on the line 10—10 of Fig. 7;

Fig. 11 is a vertical section through a part of the transmission gearing and clutch shifters located in the control box; the figure showing the three gear shafts developed in a single plane from the triangular relation illustrated in Fig. 12;

Fig. 12 is a horizontal section, looking down, on the line 12—12 of Fig. 11 but showing the shafts of the latter in their true triangular relation;

Fig. 13 is a front elevation of certain parts in the control box, showing worm gear drive and transmission to the slide drive shaft, and also showing dwell and return dogs;

Fig. 14 is a horizontal section looking upwardly through the feed safety and dwell clutch mechanism, showing dwell and return dogs engaged, and mechanism for actuating the dog engaging parts;

Fig. 15 is an enlarged vertical section through one of the control boxes and the adjacent spindle slide, showing in elevation the several trips and operating levers that control the advance, feed, dwell, and return movements of the slide;

Fig. 16 is an enlarged vertical section through one of the spindles and its bearings, showing detent mechanism, and cross-feed drive operative after the spindle has been arrested on its downward travel;

Fig. 17 is an enlarged cross-section taken on the line 17—17 of Fig. 16;

Fig. 18 is a detail view showing in elevation the cocking mechanism on the upper end of the cocking shaft, and in section the upper bearing of the latter;

Fig. 19 is a horizontal section taken on the line 19—19 of Fig. 18;

Fig. 20 is a detail view in mixed elevation and section showing cam actuated mechanism for throwing in the advance travel of the spindles;

Fig. 21 is a developed view of a single position engaging clutch on the indexing shaft;

Fig. 22 is a view in substantially the same vertical plane as Fig. 9 and showing the cam and spring actuated mechanism for operating the index locking pin;

Fig. 23 is a detail view in vertical section through parts of the bed and table showing the index locking and locating pins;

Fig. 24 is a detail elevation of the index locking pin and part of its actuating mechanism; and Fig. 25 is a top plan of the parts shown in Fig. 24.

*General structure and organization.*

Figure 1:
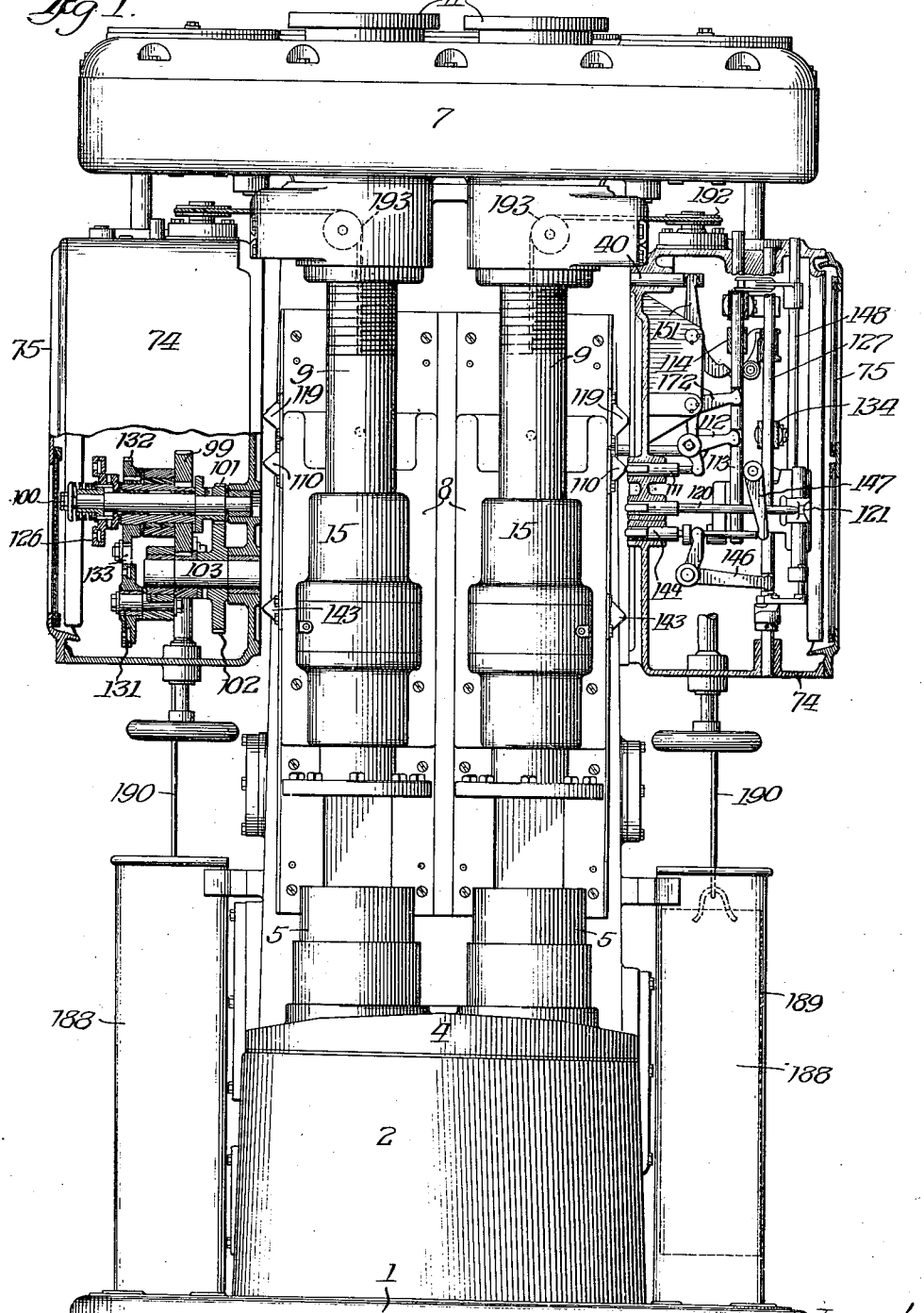
Fig. 1 is a front elevation, with the two control boxes in vertical section in different planes.

Referring to the drawings, 1 designates a base plate or block on the front portion of which is a round bed 2, on which is rotatably mounted, preferably by anti-friction bearings 3 (Fig. 3) a round work supporting table 4 having on its upper side a circular group of work supporting chucks 5, four in number in the particular machine herein shown, which is a two spindle machine, it being understood that the principle of the invention may be embodied in machines having a larger number of spindles, in which case the work holding chucks preferably exceed the number of spindles by two, one chuck receiving a fresh piece of work and another chuck discharging a finished piece of work, while the other chucks carry pieces that are being operated on by the spindle tools.

At the rear of the bed 2 is an upright frame structure taking the general form of a vertical hollow casing or housing 6, on the upper end of which is a generally rectangular horizontal head box 7 containing certain gearing hereinafter referred to.

Mounted in suitable slide-ways on the front of the vertical housing 6, are a pair of vertical slides 8, and in suitable bearings more particularly hereinafter described in these slides are mounted a pair of hollow spindles 9, disposed vertically above the rear pair of work holders 5, the lower ends of which spindles are adapted to receive a variety of cutting tools, such as the facing slide 10 shown in Figs. 3 and 16, for performing various operations upon castings held in the chucks 5. On the upper end of each spindle 9 is an adjustable spindle stop-nut 11 which has a screw-threaded engagement with the upper end of the spindle, and in the lowest position of the latter, comes to rest on the upper side of a spindle driving gear 12, this latter being keyed to a sleeve 13 (Fig. 2) journaled in an upper bearing 14 of the frame directly beneath the head box and itself splined to the spindle 9. Below the upper bearings 14 the spindles 9 are journaled in long bearings 15 formed on the front face of the vertical slides 8.

On the rear of the vertical housing 6 is a rearwardly extending bracket 16 (Figs. 2 and 3), supporting an electric motor 17 which supplies the power for operating the machine.

*Spindle driving mechanism.*

Figure 6:
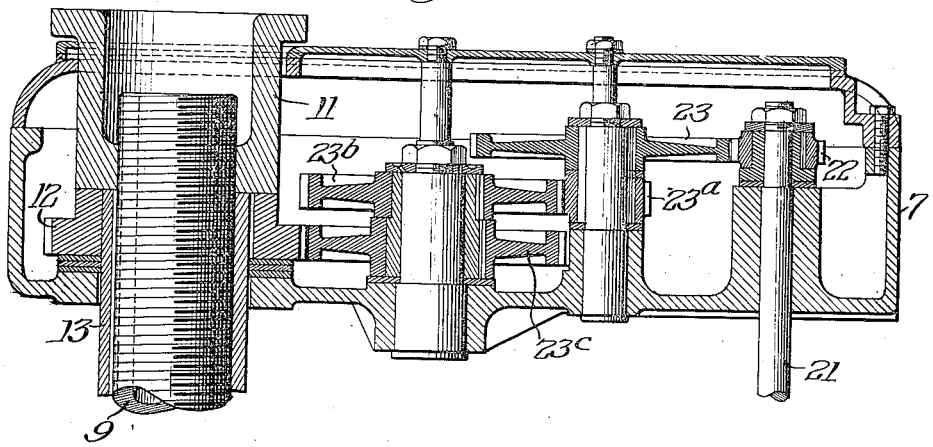
Fig. 6 is a section on the line 6—6 of Fig. 4.

The armature shaft 18 of the motor 17 (Fig. 3) carries on its inner end a bevel pinion 19 meshing with and driving a bevel gear 20 keyed on a central vertical drive shaft 21. This drive shaft 21 is journaled at its upper end in the head box 7, as shown in Figs. 3 and 6, and carries on its upper ends a gear 22 which, through two trains of speed reducing gears 23, 23ª, 23ᵇ and 23ᶜ, best shown in Fig. 6, drives the spindle gears 12. Of these, the gears 22 and 23 or 23ª and 23ᵇ may be change gears to vary the speed ratio.

*Table indexing mechanism.*

In the central vertical drive shaft 21 is interposed a safety clutch 21' (Fig. 3), and on its lower end is a worm 23 (Fig. 9) driving a worm wheel 24 (Fig. 7) splined on a clutch member 26 slidable on a horizontal shaft 25, which worm wheel 24, through clutch members 26 and 27 (Fig. 7), drives a crank disc 28, this latter, through a connecting rod 29 (Fig. 8), oscillating a pivoted sector gear 30. This latter meshes with and drives a pinion 31 that is loose on a horizontal index shaft 32 (Fig. 3), and is drivingly connected to the latter by a one way clutch 33, 34 (Figs. 3 and 21). The worm wheel 24 is restrained against lateral movement by a stationary fork indicated at 24' engaged with a groove 24ª in the hub of the gear. The index shaft 32 is journaled in the bed 2, as clearly shown in Fig. 3, and carries on its forward end a bevel pinion 35 driving a bevel gear 36 on the under side of the table 4. The sector gear 30 turns the index shaft 32 one revolution at each alternate swing, and this indexes the table from one station to the next.

*Index clutch throw-in and throw-out.*

37 designates a vertical cocking shaft that is located in the central vertical front and rear plane of the machine and has fast thereon an arm 38 (Fig. 10), to the free end of which is attached a pull spring 39 tending to turn said shaft in the direction indicated by the arrow in Fig. 19. This cocking shaft is normally held against turning by two trigger-rods or catches 40 (Figs. 1, 15 and 19) cooperating with a pair of pivoted catch levers 41 mounted on a block 42 carried by the cocking shaft. When both catches 40 have been retracted in the manner and by the mechanism hereinafter described, the spring 39 turns the shaft 37. This, through an arm 43, fast on shaft 37, a link 44, and a pivoted vertical lever 45, mounted on a bracket arm 46 (Fig. 7) rocks an elbow lever 47 that is pivoted at its elbow at 48 to a forked clutch shifter 49 that is slidably mounted on a rod 50. The other arm of the elbow lever 47 is pivoted to a link 51 at 52, forming a toggle joint, therewith. The breaking of this toggle lever upwardly permits the clutch shifter 49 which is engaged with the hub of the clutch member 26, to be drawn inwardly by a pull spring 53, thus connecting the clutch members 26 and 27 and starting the indexing movement through the mechanism already described. This release of the cocking shaft occurs only when the last tool carried by the spindles has finished its work and returned to its upper or starting position. When this has occurred, a cocking cam 54 (Figs. 8 and 9) on the hub of the crank disc 28 strikes the lower end of a pivoted lever 55, and, through a link 56, and an arm 57 fast on the cocking shaft, rocks the latter back against the pull of spring 39, until it is caught and held by both catches 40, as shown in Fig. 19. This rocks the toggle lever back to the position shown in Fig. 7, which action, through the toggle arm 51 which is pivoted to a slide 58, throws a roller 59 on the lower end of said slide into the path of a throw-out cam 60 that is also carried by the hub of the crank disc 28, and this cam striking the roller 59 on the slide 58, through the straightened toggle, retracts the clutch member 26 from the clutch member 27, thus unshipping the clutch and arresting the indexing movement.

*Table locking mechanism.*

Mechanism for securely locking the revolving table as it is turned to carry the work holders from each station to the next comprises the following parts. On the crank disc 28 is a cam 61 extending substantially half way around the disc (Fig. 8), which cam, through alternate half revolutions of the disc, engages a roller 62 carried by a pivoted elbow lever 63, the other arm of which lever is connected through an adjustable link 64 with an arm 65 (Fig. 22) fast on a shaft 66. On the forward end of shaft 66 is an arm 67 which enters a socket 68' in the lower end of a locking pin 68 (Fig. 23), said locking pin being slidably mounted in the bed 2 and at its upper end having a pair of tongues 69 entering recesses 70 in the lower side of the revolving table, and snugly engaged with said recesses through the agency of a pair of table-locating pins 71 designed to take up all lost motion and center and hold the table while locked rigid with the bed. The locking pin 68 is normally urged into locking engagement with the table through the pull of a spring 72 (Fig. 26), acting on an arm 73 fast on the shaft 66, so that the action of the cam 61 is to retract the locking pin just in advance of the indexing movement and hold it retracted during said movement, thus allowing the table to be indexed.

*Rapid traverse in.*

The organization of the machine is such that the two spindles 8, starting simultaneously from their "out" or fully elevated position, advance "in" or downwardly toward the work under rapid traverse movements, and as soon as the cutting tool of each spindle reaches or nearly reaches the work, the rapid traverse is thrown out and the appropriate feed movement is thrown in. As soon as each tool has completed its particular work on the casting, the feed is automatically thrown out, and after a brief dwell, the rapid traverse return is next thrown in, and the spindle is retracted to its fully elevated position. Since the work at the first station passes on to the second station, (and to the third, fourth, etc., where more than two spindles are employed) the next "in" or advance movement of all the spindles except the last must await the return of the last spindle. Hence, I provide for each spindle its own automatic mechanism for effecting its rapid traverse "in" movement, its feed movement, its dwell, its rapid traverse "out" movement, and its automatic devices for tripping the mechanism from one movement to the next. In the case of a two spindle machine, such as is herein shown, this automatic mechanism is largely mounted, for convenience of inspection and access, in each of a pair of control boxes 74 mounted respectively on opposite sides of the central upright housing 6, as best shown in Fig. 1, and provided with glass panel doors 75 which enable the mechanism within the boxes to be easily viewed. Since the actuating and controlling mechanisms of the two spindles on opposite sides of the central vertical front and rear plane of the machine are identical a description of one will, of course, suffice for both.

Figure 3:
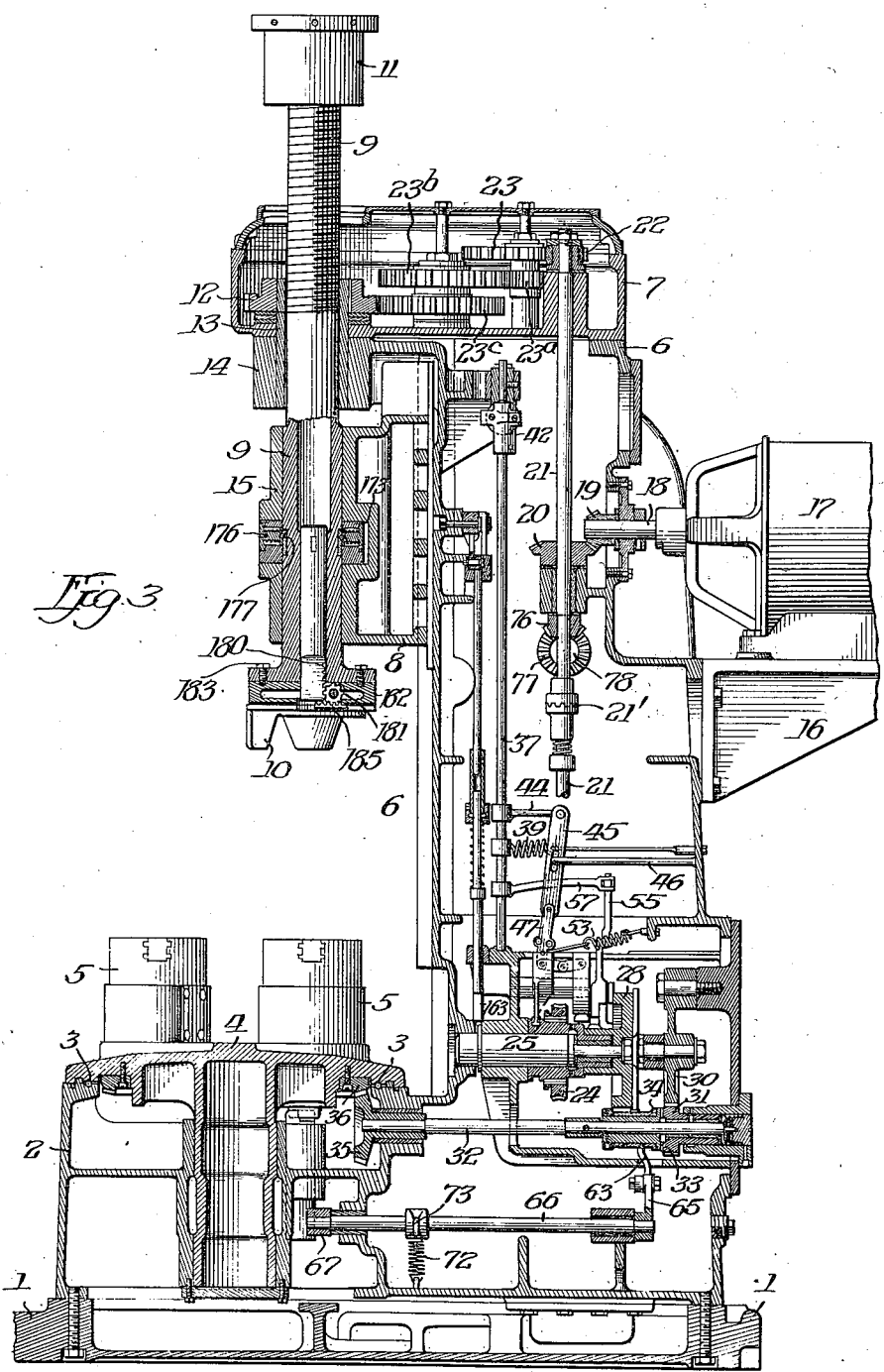
Fig. 3 is a substantially central front to rear vertical section.

Referring to Fig. 3, fast on the central vertical drive shaft 21 is a bevel gear 76 driving a bevel gear 77 fast on a cross shaft 78. On the other end of the shaft 78 in the control box is a bevel gear 79 (Fig. 11) driving a bevel gear 80 on the lower end of a vertical shaft 81 journaled in the control box 74. Fast on shaft 81 is a spur gear 82, which, as shown in Fig. 12, meshes with both a gear 83 on a vertical shaft 84 and a reversing gear 85 on a counter-shaft 86. Gear 83 is loose on shaft 84 and has a clutch connection 87, 88 with a gear 89 slidably and rotatably mounted on shaft 84. Gear 89 drives a gear 90 keyed on the upper end of counter-shaft 86. Keyed on the lower end of counter-shaft 86 is a gear 91 driving a gear 92 loose on the lower end of shaft 84, this latter gear, through a clutch 93, 94, driving an upper gear 95, which latter drives a gear 96 (Fig. 13) fast on a worm shaft 97, this latter having a worm 98 driving a worm gear 99 that has a yieldable drive connection to a shaft 100, this latter carrying a spur pinion 101 meshing with and driving a spur gear 102 fast on a shaft 103, which latter carries a pinion 104 (Fig. 16) meshing with a vertical rack 105 on the spindle slide 8.

Feed.

Figure 4:
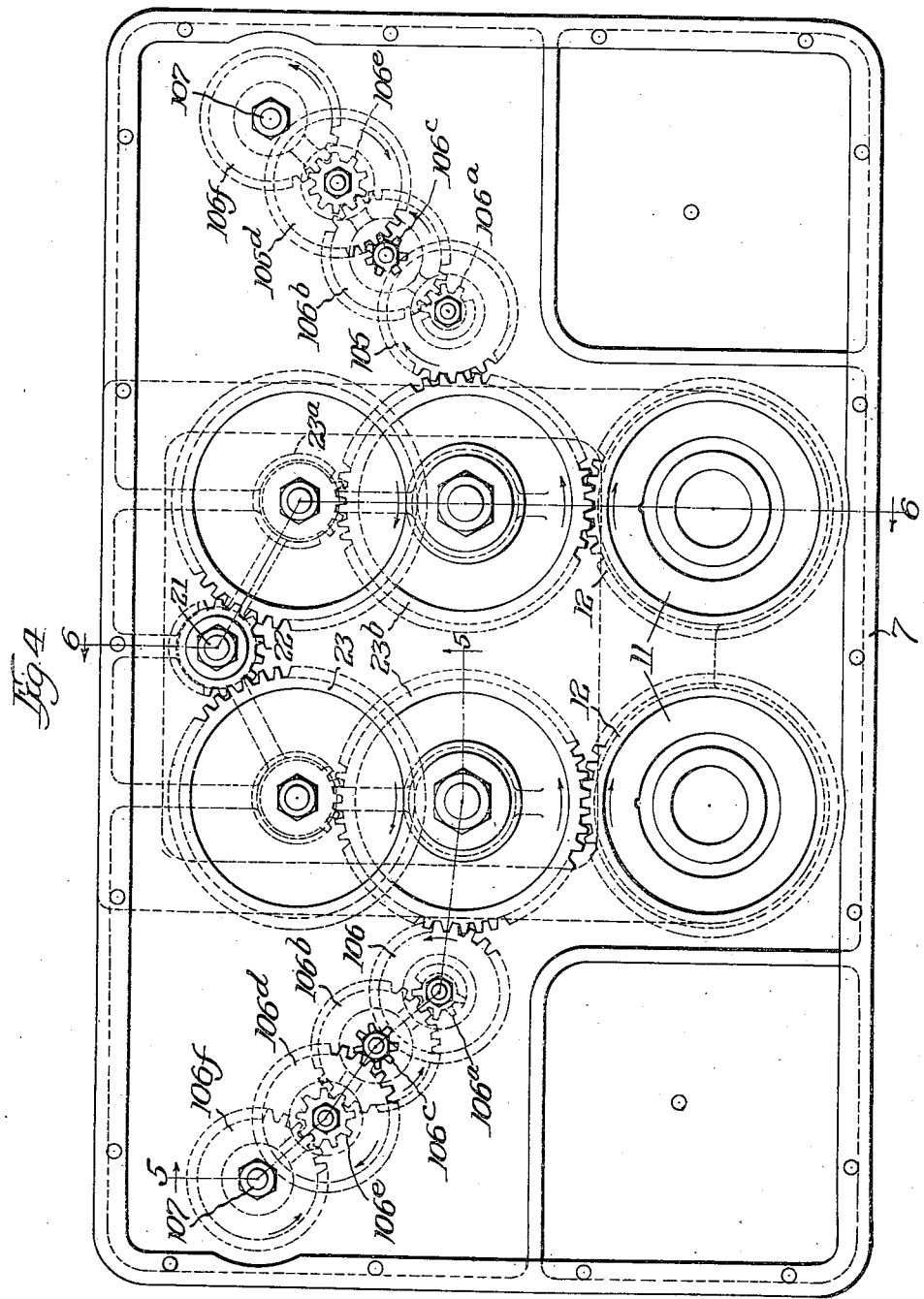
Fig. 4 is a top plan view of the spindle and feed gear trains within the head box.
Figure 5:
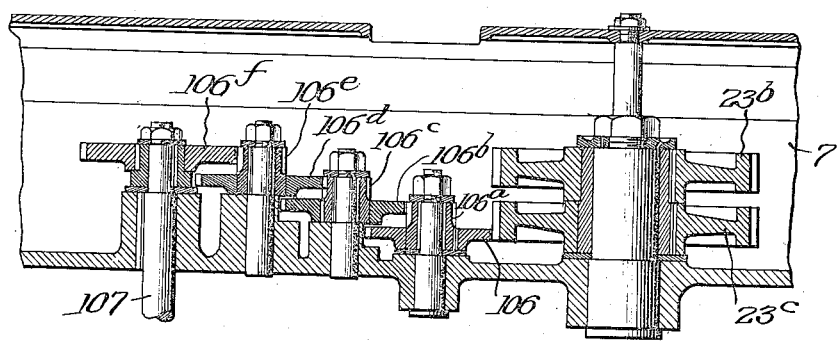
Fig. 5 is a section on the line 5—5 of Fig. 4.

Referring to Figs. 4 and 5, starting from each of the speed reduction gears 23ᶜ of the spindle transmission train is another speed reduction train of gears 106, 106ᵃ, 106ᵇ, 106ᶜ, 106ᵈ, 106ᵉ and 106ᶠ, the last gear of this train being fast on a vertical shaft 107 (Fig. 11) which is mounted above and in line with the shaft 84. Splined on the lower end of shaft 107 is a clutch member 108 that cooperates with a clutch member 109 on the upper end of the hub of the gear 89. When the clutch members 108 and 109 are coupled the feed movement is transmitted through the train last described, down to the gear 89, and from the latter to the slide 8 through the mechanism already described as effecting the rapid traverse "in" movement of the slide.

Automatic rapid transverse throw-out and feed throw-in.

I will next describe the automatic mechanism through which, at the conclusion of the rapid transverse in movement, this movement is automatically tripped out and the feed movement tripped in. Referring to Fig. 15 on the outer edge of the slide 8 is an adjustable trip dog 110 that, as the slide descends to a point at which the rapid traverse in movement should stop, strikes a slide rod 111 mounted in the rear wall of the control box, and this rod rocks an elbow lever 112, one arm of which is engaged with a vertically slidably rod 113 (Fig. 11). Fast on the rod 113 is an arrow cam 114 which at this time lies below the outer pointed end of a spring pressed plunger 115 that forms one arm of a clutch shifter lever 116 pivoted at 117 on a bracket 118, the other arm of said lever embracing the hub of the gear 89, the upper end of which latter carries the clutch member 109 while its lower end carries the clutch member 88. As the arrow cam 114 rises and snaps past the plunger 115, the clutch members 87 and 88 (forming a part of the rapid traverse gear train) are uncoupled, and the clutch members 109 and 108 (forming part of the feed train) are coupled. The working or feed movement of the spindle then continues until the particular cutting operation on the work is completed, whereupon the feed is arrested automatically, and, after a brief dwell to allow removal of the tool mark from the work, the rapid traverse out or return movement is tripped in.

Automatic trip from feed to return movement.

On the outer edge of the slide 8 and in a different vertical plane from that of cam lug 110 is a second adjustable cam lug 119 which, when the slide has reached a position at which the feed movement is completed, strikes and forces outwardly a dwell and return rod 120 slidably mounted in the rear wall of the control box below the push rod 111. The outer end of rod 120 bears against an arm 121 (Figs. 13 and 14) formed on a stop lug 122 that is hinged on a vertical rod 123 and held against up and down movement between a pair of rigid arms 124 in which the rod 123 is mounted, and forces the lug 122 into the path of a dwell dog 125 that is adjustably mounted on the periphery of a spring-pressed ratchet clutch disc 126 that constitutes a yieldable or safety element of the feed transmission, this clutch disk 126 being splined on the shaft 100 (Fig. 14). This arrests the feed of the spindle and its slide during a few spindle revolutions to erase the tool mark from the work, before the "out" or return movement is tripped in. This latter is effected by the following mechanism. Hinged on a vertical rod 127 behind the rod 123 is a lift lug 128, similar in structure to the stop lug 122 and confined on said rod between collars 128'. This lift lug is connected to the stop lug 122 to swing in unison with the latter by a link 129. When the stop lug 122 is swung into the path of the dwell dog 125, the lift lug 128 is simultaneously swung into the path of a return dog 130 that is adjustably mounted on the periphery of a gear 131 journaled below and behind the ratchet disk 126 and geared to the hub or sleeve 99' of the worm wheel 99 through a gear 132 on said hub or sleeve, and an intermediate gear 133, so as to turn in the same direction as ratchet disk 126. Return dog 130 is set slightly behind dwell dog 125, and as it engages the lug 128, it lifts the rod 127. Referring to Figs. 11 and 15, fast on the rod 127 is an arrow cam 134 that, as it rises, wipes across the pointed end of a spring-pressed plunger 135 forming part of a clutch shifting lever 136 that is pivoted at 137 and engages with the hub of the gear 95 that carries on its upper end a clutch member 138 cooperating with a clutch member 139 on the lower end of an intermediate gear 140 loose on the shaft 84 directly beneath the gear 83. The arrow cam 134, operating as described on the clutch shifter 136, separates the clutch members 93, and 94, thus interrupting the feed drive and instantly thereafter couples the clutch members 138 and 139, whereby the gear 95 is driven in the reverse direction by the reversing gear 85 through the intermediate gear 140, thereby throwing in the rapid traverse "out" or return movement of the spindle.

*Return throw-out.*

The out or return mechanism having been tripped into action as above described, the slide carrying the spindle makes a rapid upward or return movement until the latter is automatically thrown out by the mechanism next to be described. On the outer edge of the slide 8 and in another vertical plane is a third trip dog 143 (Fig. 15) which, as the slide approaches its fully raised position, strikes and forces outwardly a push rod 144 slidably mounted in the back wall of the control box. In the rod 144 is a cross pin 145 which strikes one arm of an elbow lever 146. The other arm of said lever is engaged with the rod 127 which carries the arrow cam 134. This moves the cam 134 downwardly, and as the same snaps past the plunger of the clutch shifter 136, it disconnects the clutch members 138 and 139, thus throwing out the reverse or backward traverse, and instantly thereafter throws in the clutch members 94 and 93 which constitute the lower feed clutch. Simultaneously with this operation, however, the push rod 144 rocks an elbow lever 147 (Fig. 15) one arm of which underlies the lower end of a vertical rod 148 that carries on its upper end a clutch shifter 149, the fork of which straddles the clutch member 108 (Fig. 11), thereby throwing out the upper feed clutch 108, 109; so that, when the first spindle to return has completed its back traverse, it will not automatically start down again when this back traverse is tripped out, but will await the return or back traverse movement of the last spindle to finish its work.

*Indexing trip as last spindle makes its return travel.*

By reference to Fig. 15 it will be observed that each of the trip rods or triggers 40 which, as shown in Fig. 19, operate to hold the cocking shaft 37 against turning under the pull of spring 39, is slidably mounted in a bearing in the rear wall of the control box near the upper end of the latter, and is normally forced inwardly to engaging position with the elbow lever catch 41 by a spring 150. The outer end of each trip rod 40 is engaged by the upper end of a trip lever 151 pivoted at 152 on a bracket 153. The lower end of the lever 151 extends toward the front of the control box and is formed with an arrow point 154. Fast on the vertical rod 127 is a bracket 155 on which is pivoted an elbow lever 156, the upstanding arm of which is pressed outwardly by a spring 157. The other rearwardly extending arm of lever 156 is formed with an arrow point 158 whose path of travel, as the rod 127 moves up and down, intersects the arrow point 154 of lever 151. As the rod 127 is moved downwardly to effect the return throw out, as last described, the arrow point 158 wipes past the arrow point 154, thereby rocking the lever 151 and retracting the trip rod 40. This action occurs during the return movement of each spindle; but the cocking shaft is not released until the second trip rod 40 is retracted on the return movement of the second or last spindle. This releases the cocking shaft, and trips in the table indexing movement through the mechanism already described. During the return or upward movement of the rod 127, the lever 156 idly passes the lower end of lever 151, the spring 157 permitting the lever 156 to rock on its pivot during such return movement.

*Advance travel trip-in.*

As soon as the indexing of the table is completed, the downward rapid advance travel of the slides and their spindles is automatically tripped in by the mechanism next to be described and illustrated mainly in Figs. 7, 9 and 20. Fast on the shaft 25 is a disc 158 on which is a cam 159 which, at the completion of each revolution of shaft 25 engages with a roller 160 carried by an arm 161 fast on a stub-shaft 162. Keyed on the stub-shaft 162 is an arm 163, and on the free end of which is stepped the lower end of a lift rod 164 guided in suitable bearings 164ª. The lift rod is made in two sections 164, and 164' that are connected, as shown in Fig. 20, by a safety device comprising a sleeve 165 yieldably connected to the upper rod section 164' by a ball clutch 165' and having on its lower end a nut 166 sleeved on the lower rod section 164, and a compression spring 167 abutting at its upper end against the nut 166 and at its lower end against a collar 168 keyed on the rod section 164. The sleeve 165 carries a key 165ª extending through a vertical slot 164ᵇ in the upper end of the rod section 164. The upper end of rod section 164' carries a cross pin 169 that is engaged with the forked ends of the horizontal arms of a pair of oppositely disposed elbow levers 170. To the depending arms of said levers are pivoted connecting rods 171, each of which at its outer end is connected to the depending arm of a bell crank lever 172, the other arm of which lever is engaged with the vertical rod 113. This is the rod that carries the arrow cam 114 which, on its downward movement operates the clutch shifter 116 to couple the clutch members 87 and 88, and thereby establish the gear train through which the rapid advance or downward travel of the slides and spindles is effected. By reason of the described safety device in the lift rod 164, breakage is avoided in the event of any sticking of the clutch shifting rods 113.

The complete cycle of operations of the machine has now been described. It remains to describe a few auxiliary features that are preferably incorporated in the machine, but the use of which is optional.

*Facing slide actuating mechanism.*

Referring to Figs. 16 and 17, within the slide bearing 15 of each spindle is formed a circular chamber 173, in which is fitted a collar 174 that embraces the spindle 9. This collar 174 is formed with a series of radial cylindrical chambers 175 in each of which is mounted a yieldable spring pressed plunger 176 that presses a hardened steel ball 177 into locking engagement with a hardened steel plate 178 set in the outer surface of the spindle, said plate having a suitable seat to receive the ball. By this mechanism the slide 15 is yieldably locked to the spindle with sufficient force to raise and lower the latter and feed the spindle against the work. The lower portion of the bore of the spindle is slightly contracted, as shown in Fig. 16, and slidably mounted in the said contracted lower end is a feed bar 179 having a rack 180 on its lower end. This rack is engaged with a feed pinion 181 journaled in a slide holder 182 detachably secured to the lower end of the spindle as by screws 183. Fast on the shaft of the pinion 181 is a second pinion 184 meshing with a horizontal rack 185 on a facing slide, such as the slide 10, which is designed to effect a facing cut on the work. Assuming that the spindle has reached its lowermost position, with the stop nut 11 in contact with the upper side of the spindle drive gear 12, as shown in Fig. 16, and that it is desired to perform a facing operation on the work, the feed bar 179 can be fed downwardly under a further downward feed of the slide, and this is effected by means of a key 186 which extends through a diametric slot 187 in the collar 174, spindle 9, and feed bar 179. The portions of the slot which extend through the collar and the feed bar are of a size to just fit the key, while the portion of the slot in the spindle itself is of greater depth than the key, as indicated in dotted lines, Fig. 16, so that, as the slide is forced down, with the spindle held against further downward movement by the nut 11, the clutch mechanism connecting the slide and spindle yields, and the slide continues to feed down, carrying with it, through the key 186, the feed bar 179 and thus effecting a feed of the facing slide 10 until such feed has been automatically tripped out by the mechanism previously described.

*Spindle and drive counterbalance.*

Figure 2:
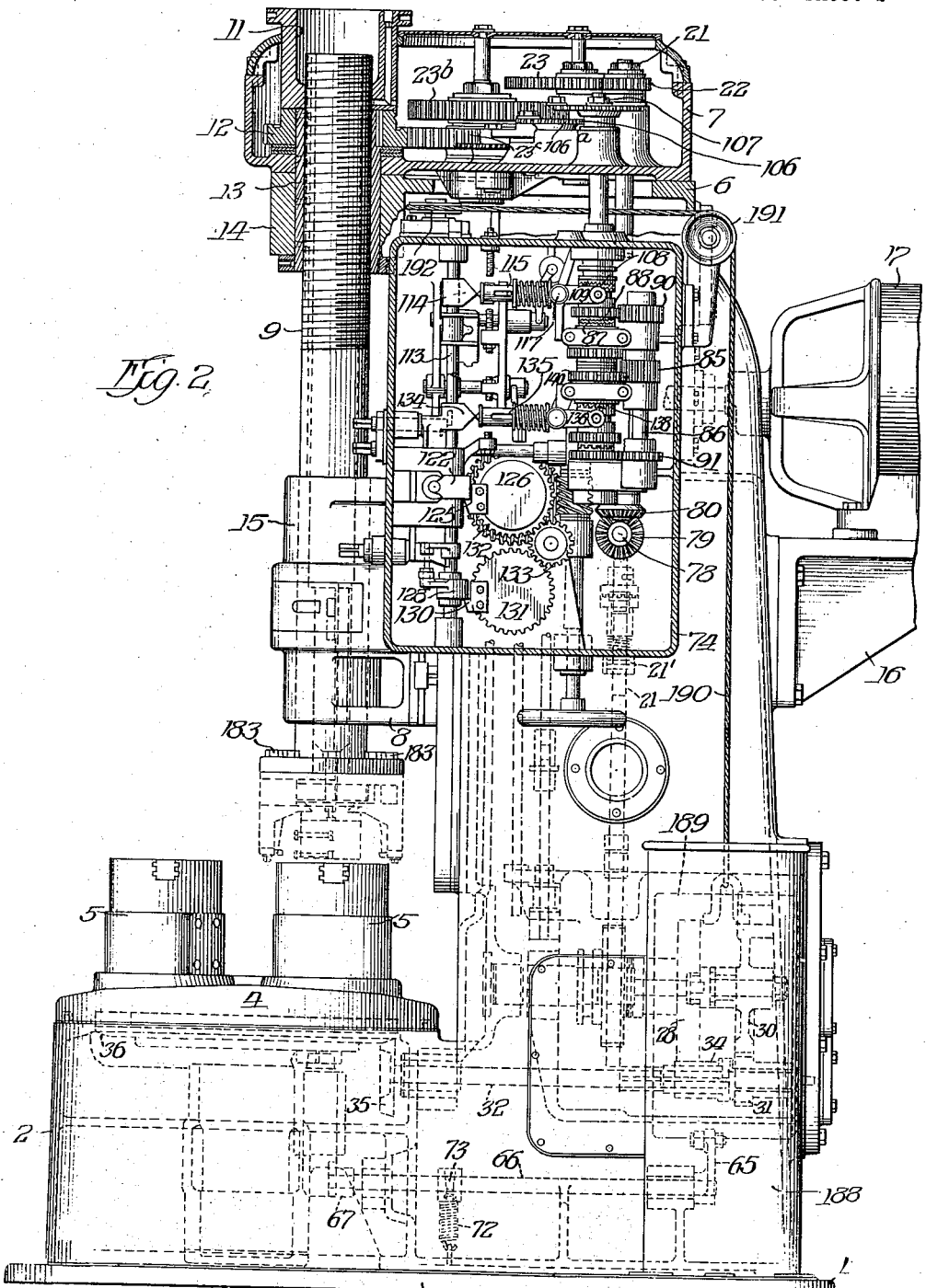
Fig. 2 is a side elevation, with the head box and one of the control boxes in vertical section.

In a vertical machine of this type, it is, of course, desirable to provide means for counter balancing relatively heavy vertically reciprocating parts, such as the slides and spindles of the present machine; and in Figs. 1 and 2 I have illustrated one practical form of counter-balance as follows: On opposite sides of the main housing 6 are mounted on the bed plate a pair of wells 188 each containing a counter-weight 189 of approximately the weight of a slide and its spindle. From the weight there extends upwardly a cable 190 which passes first over a vertical sheave 191 at the rear, upper corner of the control box, the cable extending thence horizontally and forwardly around a horizontal sheave 192 on the upper front corner of the control box, thence inwardly toward the center of the machine and over a vertical sheave 193, and thence downwardly and connected to the upper ends of the slides 8.

I have herein shown and described one embodiment of the present invention which has been found in practice to satisfactorily effectuate the stated purposes and objects of the invention, and to be capable of performing a wide range of cutting, drilling, boring, facing and other machine operations upon castings of various kinds. Although I have herein disclosed a unit machine employing only two spindles and four work carriers, it is manifest that this unit is capable of multiplication in machines employing four spindles and six work carriers, six spindles and eight work carriers, etc., such four spindle and six spindle machines having been built and demonstrated. And, if desired, the revolving table may be equipped with only one work holder in excess of the number of spindles; the finished piece being first unchucked therefrom and the new piece then chucked therein. Of course, the greater the number of spindles, the wider is the range of operations capable of being simultaneously performed by the machine. For instance, where a piece of work may require six different operations, these operations can all be performed in a single passage of the work through a six spindle machine without requiring re-chucking, and these six different operations can all be going on simultaneously on as many different pieces of work. Hence, in a sense the machine combines in its structure practically as many different individual machines as there are spindles, all driven from a single power shaft and so co-ordinated and related that, as each spindle finishes its work, it returns to starting position and there awaits the return of the last spindle of the series before the work table is indexed to carry each work holder on to the next station.

Manifestly, in a full automatic machine of this character many changes and variations in the details of structure and mechanism will suggest themselves to machinists, conversant with this type of machine tool, and may be substituted in the present machine without involving any change in its principles of operations or sacrificing any of the advantages which inhere therein. Hence, in the appended claims I have defined the novel features of the invention broadly, and I desire to reserve all such variations and modifications as fall within the spirit and purview of the claims.

I claim:

1. In a machine of the character described, the combination of a bed, a rotary table on said bed, a series of work holders carried by said table, an upright frame structure in rear of said bed, a plurality of slides mounted to reciprocate vertically on said frame structure, a corresponding plurality of vertical spindles journaled in said slides, a power shaft, independent driving connections from said power shaft to said spindles, independent power transmission mechanisms from said power shaft to said slides for reciprocating the latter, and means actuated from said power shaft for indexing said table.

2. In a machine of the character described, the combination of a bed, a rotary table on said bed, a circular group of equally spaced work holders carried by said table, an upright frame structure in rear of said bed, a plurality of slides mounted to reciprocate vertically on said frame structure, a corresponding plurality of vertical spindles journaled in said slides, a power shaft, independent speed-reducing gear trains from said power shaft to said spindles to revolve the latter, independent power-transmitting gear trains from said power shaft to said slides, said last named gear trains including clutch-controlled elements through which both advance and feed movements are transmitted to said slides, and automatic means for shifting said clutch-controlled elements whereby to trip out the advance movement and trip in the feed movement.

3. In a machine of the character described, the combination of a bed, a rotary table on said bed, a circular group of equally spaced work holders carried by said table, an upright frame structure in rear of said bed, a plurality of slides mounted to reciprocate vertically on said frame structure, a corresponding plurality of vertical spindles journaled in said slides, a power shaft, independent speed-reducing gear trains from said power shaft to said spindles to revolve the latter, independent power transmitting gear trains from said power shaft to said slides, said last-named gear trains including clutch-controlled elements through which advance, feed, and return movements are transmitted to said slides, automatic means for shifting said clutch-controlled elements whereby to trip out the advance movement and trip in the feed movement, and other automatic means for shifting said clutch-controlled elements whereby to trip out the feed movement and trip in the return movement.

4. In a machine of the character described, the combination of a bed, a rotary table on said bed, a circular group of equally spaced work holders carried by said table, an upright frame structure in rear of said bed, a plurality of slides mounted to reciprocate vertically on said frame structure, a corresponding plurality of vertical spindles journaled in said slides, a power shaft, independent speed-reducing gear trains from said power shaft to said spindles to revolve the latter, independent power transmitting gear trains from said power shaft to said slides, said last-named gear trains including clutch-controlled elements through which advance, feed, and return movements are transmitted to said slides, automatic means for shifting said clutch-controlled elements whereby to trip out the advance movement and trip in the feed movement, other automatic means for shifting said clutch-controlled elements whereby to trip out the feed movement and trip in the return movement, means actuated from said power shaft for indexing said table, and automatic means for tripping out said return movement and tripping in said indexing means.

5. In a machine of the character described, the combination of a bed, a rotary table on said bed, a circular group of equally spaced work holders carried by said table, an upright frame structure in rear of said bed, a plurality of slides mounted to reciprocate vertically on said frame structure, a corresponding plurality of vertical spindles journaled in said slides, a power shaft, independent speed-reducing gear trains from said power shaft to said spindles to revolve the latter, independent power transmitting gear trains from said power shaft to said slides, said last named gear trains including clutch controlled elements through which advance, feed and return movements are transmitted to said slides, automatic means for shifting said clutch controlled elements, whereby to trip in the advance movement, automatic means for shifting said clutch controlled elements whereby to trip out the advance movement and trip in the feed movement, and automatic means for shifting said clutch-controlled elements whereby to trip out the feed movement and trip in the return movement.

6. In a machine of the character described, the combination of a bed, a rotary table on said bed, a circular group of equally spaced work holders carried by said table, an upright frame structure in rear of said bed, a plurality of slides mounted to reciprocate vertically on said frame structure, a corresponding plurality of vertical spindles journaled in said slides, a power shaft, independent speed-reducing gear trains from said power shaft to said spindles to revolve the latter, independent power transmitting gear trains from said power shaft to said slides, said last named gear trains including clutch controlled elements through which advance, feed and return movements are transmitted to said slides, automatic means for shifting said clutch-controlled elements, whereby to trip in the advance movement, automatic means for shifting said clutch-controlled elements whereby to trip out the advance movement and trip in the feed movement, automatic means for shifting said clutch-controlled elements whereby to trip out the feed movement and trip in the return movement, and automatic means for shifting said clutch-controlled elements whereby to trip out the return movement.

7. In a machine of the character described, the combiation of an upright frame structure, a slide mounted to reciprocate vertically on said frame structure, a vertical spindle journaled in said slide, means for revolving said spindle, a power shaft, a power transmitting gear train from said power-shaft to said slide including clutch-controlled elements through which both advance and feed movements are transmitted to said slide, a trip dog adjustably mounted on said slide, and means actuated by said dog on the descending travel of said slide for shifting said clutch-controlled elements to trip out the advance movement and trip in the feed movement.

8. In a machine of the character described, the combination of an upright frame structure, a slide mounted to reciprocate vertically on said frame structure, a vertical spindle journaled in said slide, means for revolving said spindle, a power shaft, a power transmitting gear train from said power shaft to said slide including clutch-controlled elements through which advance, feed, and return movements are transmitted to said slide, a trip dog adjustably mounted on said slide, means actuated by said dog on the descending travel of said slide for shifting said clutch-controlled elements to trip out the advance movement and trip in the feed movement, a second trip dog adjustably mounted on said slide, and means actuated by said second dog on the descending travel of said slide for shifting said clutch-controlled elements to trip out the feed movement and trip in the return movement.

9. In a machine of the character described, the combination of an upright frame structure, a slide mounted to reciprocate vertically on said frame structure, a vertical spindle journaled in said slide, means for revolving said spindle, a power shaft, a power transmitting gear train from said power shaft to said slide including clutch-controlled elements through which advance, feed, and return movements are transmitted to said slide, a trip dog adjustably mounted on said slide, means actuated by said dog on the descending travel of said slide for shifting said clutch-controlled elements to trip out the advance movement and trip in the feed movement, a second trip dog adjustably mounted on said slide, and means actuated by said second dog on the descending travel of said slide for shifting said clutch-controlled elements to trip out the feed movement and trip in the return movement, said last named means including mechanism for effecting a dwell between the tripping out of the feed and the tripping in of the return.

10. In a machine of the character described, the combination of an upright frame structure, a slide mounted to reciprocate vertically on said frame structure, a vertical spindle journaled in said slide, means for revolving said spindle, a power shaft, a power transmitting gear train from said power shaft to said slide including clutch-controlled elements through which advance, feed, and return movements are transmitted to said slide, a trip dog adjustably mounted on said slide, means actuated by said dog on the descending travel of said slide for shifting said clutch-controlled elements to trip out the advance movement and trip in the feed movement, a second trip dog adjustably mounted on said slide, means actuated by said second dog on the descending travel of said slide for shifting said clutch-controlled elements to trip out the feed movement and trip in the return movement, said last named means including mechanism for effecting a dwell between the tripping out of the feed and the tripping in of the return, a third trip dog adjustably mounted on said slide, and means actuated by said third dog on the ascending travel of said slide for shifting said clutch-controlled elements to trip out the return movement.

11. In a machine of the character described, the combination of an upright frame structure, a pair of vertically reciprocable slides mounted on said frame structure, independently controlled mechanisms for actuating said slides, a pair of spindles journaled in said slides respectively, a vertical drive shaft journaled in said frame structure, and speed reducing gear trains connecting said drive shaft with said spindles, respectively.

12. In a machine of the character described, the combination of an upright frame structure, a pair of vertically reciprocable slides mounted on said frame structure, independently controlled mechanisms for actuating said slides, a pair of spindles journaled in said slides, respectively, a head box mounted on said frame structure, a vertical drive shaft journaled in said frame structure and head box, and a pair of speed reducing gear trains in said head box connecting the upper end of said drive shaft with the upper ends of said spindles.

13. In a machine of the character described, the combination of an upright frame structure, a vertically reciprocable slide mounted on said frame structure, a spindle journaled in vertical bearings on said slide and the upper portion of said frame structure, means for rotating said spindle, and an adjustable stop nut on the upper end of said spindle.

14. In a machine of the character described, the combination of a hollow upright frame structure, a pair of vertically reciprocable slides mounted on said frame structure, a pair of spindles carried by said slides, means for rotating said spindles, a vertical drive shaft journaled in said frame structure, a pair of control boxes mounted on opposite sides of said frame structure, and independent sets of feed works for said slides mounted in said control boxes and operatively connected to said drive shaft and said slides.

15. In a machine of the character described, the combination of a hollow upright frame structure, a pair of vertically reciprocable slides mounted on said frame structure, a pair of spindles carried by said slides, means for rotating said spindles, a vertical drive shaft journaled in said frame structure, a pair of control boxes mounted on opposite sides of said frame structure, independent sets of feed works for said slides mounted in said control boxes, a pair of cross shafts geared at their inner ends to said drive shaft and at their outer ends to said feed works, and another pair of cross-shafts geared at their outer ends to said feed works and at their inner ends to said slides to reciprocate the latter.

16. In a machine of the character described, the combination of a hollow upright frame structure, a pair of vertically reciprocable slides mounted on said frame structure, a pair of spindles carried by said slides, means for rotating said spindles, a vertical drive shaft journaled in said frame structure, a pair of control boxes mounted on opposite sides of said frame structure, independent sets of feed works for said slides mounted in said control boxes and operatively connected to said drive shaft and said slides, each of said feed works including shiftable clutch-driven gears through which advance, feed, and return movements are transmitted to said slides and mechanism for shifting said gears, and trip dogs adjustably mounted on said slides for actuating said gear shifting mechanism.

17. In a machine of the character described, the combination of a hollow upright frame structure, a pair of vertically reciprocable slides mounted on said frame structure, a pair of spindles carried by said slides, a motor mounted on the rear wall of said frame structure with its shaft extending through said wall, a vertical drive shaft journaled in said frame structure and geared to said motor shaft, independent trains of speed reducing gears leading from said drive shaft to said spindles, respectively, independent trains of gears leading from said drive shaft to said slides, respectively, and each including shiftable elements through which advance, feed, and return movements are transmitted to said slides, adjustable trip dogs on said slides, and means actuated by said trip dogs for tripping out the advance and tripping in the feed movements of said slides, tripping out the feed and tripping in the return movements, and tripping out the return movement.

18. In a machine of the character described, the combination with a rotary work table, and work holders carried thereby, of a plurality of spindle slides and spindles mounted thereon, mechanism for indexing said work table, independent gear trains for effecting advance travel of said slides toward said work holders, each of said gear trains including a clutch, and means actuated from a moving element of said indexing mechanism for simultaneously throwing in all of said clutches at the conclusion of the table indexing operations.

19. In a machine of the character described, the combination with a rotary work table, and work holders carried thereby, of a plurality of spindle slides and spindles mounted thereon, indexing mechanism for said work table, independent gear trains for effecting advance travel of said slides toward said work holders, each of said gear trains including a clutch, clutch shifters for said clutches, a lift rod, means for actuating all of said clutch shifters from said lift rod, a cam operated by said indexing mechanism at each actuation of the latter, and means actuated by said cam for raising said lift rod whereby to simultaneously throw in all of said clutches and start the advance travel of said slides.

20. In a machine of the character described, the combination with a rotary work table, and work holders carried thereby, of a plurality of spindle slides and spindles mounted thereon, indexing mechanism for said work table, independent gear trains for effecting the advance and return movements of said slides, independent means for automatically tripping out the return movement of each slide, automatic means for tripping in the indexing movement of the table simultaneously with the return movement of the last spindle to finish its work, and means actuated from said indexing mechanism for tripping in the advance movement of all of said slides simultaneously with the conclusion of the indexing operation.

21. In a machine of the character described, the combination with a frame structure, of a spindle slide mounted thereon, a spindle journaled in said frame structure and slide, a yieldable clutch connecting said spindle to said slide, a stop limiting the inward travel of said spindle, a facing slide mounted on the inner end of said spindle, and mechanism actuated by said spindle slide after the inward movement of said spindle has been arrested by said stop for transmitting a feed movement to said facing slide.

22. In a machine of the character described, the combination with a frame structure, of a spindle slide mounted thereon, a spindle journaled in said frame structure and slide, a yieldable clutch connecting said spindle to said slide, an adjustable stop nut on the outer end of said spindle to limit the inward travel of the latter, a facing slide mounted on the inner end of said spindle, and mechanism actuated by said spindle slide after the inward movement of said spindle has been arrested by said stop nut for transmitting a feed movement to said facing slide.

23. In a machine of the character described, the combination with a frame structure, of a spindle slide mounted thereon, a spindle journaled in said frame structure and slide, a yieldable clutch connecting said spindle to said slide, a stop nut on the outer end of said spindle to limit the inward travel of the latter, a facing slide mounted on the inner end of said spindle, a feed bar slidably mounted on the inner end portion of said spindle, a key connecting said spindle slide to said feed bar, and rack and pinion mechanism for actuating said facing slide from said feed bar.

24. In a machine of the character described, the combination with a frame structure, of a spindle slide mounted thereon, a hollow spindle journaled in said frame structure and slide and formed with a transverse slot, a yieldable clutch connecting said spindle to said slide, a stop nut on the outer end of said spindle to limit the inward travel of the latter, a facing slide mounted on the inner end of said spindle, a feed bar slidably mounted in the inner end portion of said hollow spindle, a key extending through said spindle slide and feed bar and traveling in the slot of said spindle, and rack and pinion mechanism for actuating said facing slide from said feed bar.

25. In a vertical automatic machine of the class described, the combination of a base, a bed on said base, a rotatable work table mounted on said bed, a circular group of work holders on said table, a hollow upright frame structure in rear of said bed, a plurality of spindle slides mounted side by side to travel vertically on said frame structure above said work table, a vertical drive shaft within said frame structure, a head box mounted on said frame structure and enclosing the upper ends of said spindles and drive shaft, independent speed reducing gear trains in said head box between the upper end of said drive shaft and the upper ends of said spindles, respectively, independent sets of feed works between said drive shaft and said slides, respectively, a table indexing mechanism operated from said drive shaft, and a motor mounted on the rear wall of said hollow frame structure and having its shaft directly geared to said drive shaft.

26. In a vertical automatic machine of the class described, the combination of a base, a bed on said base, a rotatable work table mounted on said bed, a circular group of work holders on said table, a hollow upright frame structure in rear of said bed, a plurality of spindle slides mounted side by side on the front of said frame structure above said work table, a pair of control boxes mounted on the sides of said frame structure, respectively, and provided with doors affording access thereto, a vertical drive shaft within said frame structure, a head-box mounted on said head structure and enclosing the upper ends of said spindle and drive shaft, independent speed reducing gear trains in said head box between the upper end of said drive shaft and the upper ends of said spindles, respectively, independent sets of feed works between said drive shaft and said slides housed within said control boxes, table indexing mechanism operated from said drive shaft, and a motor mounted on the rear wall of said hollow frame structure and having its shaft directly geared to said drive shaft.

WM. N. STEVENS.